(12) United States Patent
Sakurada

(10) Patent No.: US 11,407,430 B2
(45) Date of Patent: Aug. 9, 2022

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 16/802,119

(22) Filed: Feb. 26, 2020

(65) Prior Publication Data

US 2020/0290644 A1 Sep. 17, 2020

(30) Foreign Application Priority Data

Mar. 13, 2019 (JP) .............................. JP2019-045626

(51) Int. Cl.
*B60W 60/00* (2020.01)
*G05D 1/02* (2020.01)
*G05D 1/00* (2006.01)

(52) U.S. Cl.
CPC ....... *B60W 60/0021* (2020.02); *G05D 1/0088* (2013.01); *G05D 1/0212* (2013.01)

(58) Field of Classification Search
CPC ............ B60W 60/0021; G05D 1/0088; G05D 1/0212
USPC ......................................................... 701/26
See application file for complete search history.

(56) References Cited

U.S. PATENT DOCUMENTS

| | | | | |
|---|---|---|---|---|
| 9,733,096 | B2 * | 8/2017 | Colijn | G01C 21/343 |
| 9,983,582 | B2 * | 5/2018 | Nemec | G05D 1/0055 |
| 10,740,729 | B1 * | 8/2020 | Leary | G01C 21/367 |
| 2015/0012341 | A1 * | 1/2015 | Amin | G01C 21/3438 705/13 |
| 2017/0169366 | A1 * | 6/2017 | Klein | G06Q 50/30 |
| 2018/0136655 | A1 * | 5/2018 | Kim | G05D 1/0011 |
| 2018/0224858 | A1 * | 8/2018 | Watanabe | G05D 1/0088 |
| 2018/0342035 | A1 * | 11/2018 | Sweeney | G06Q 50/30 |
| 2018/0374002 | A1 * | 12/2018 | Li | G06F 3/017 |
| 2019/0025819 | A1 * | 1/2019 | Ferguson | G05D 1/0088 |
| 2019/0033860 | A1 * | 1/2019 | Okimoto | G05D 1/0088 |
| 2019/0041855 | A1 * | 2/2019 | Suzuki | B60R 25/25 |
| 2019/0086223 | A1 | 3/2019 | Tanaka et al. | |
| 2019/0265703 | A1 * | 8/2019 | Hicok | G06Q 50/30 |
| 2020/0050198 | A1 * | 2/2020 | Donnelly | G01C 21/343 |
| 2020/0117215 | A1 * | 4/2020 | Shiga | B60W 60/00253 |

FOREIGN PATENT DOCUMENTS

JP 2008-003027 A 1/2008
WO 2017/179285 A1 10/2017

* cited by examiner

*Primary Examiner* — Yazan A Soofi
(74) *Attorney, Agent, or Firm* — Oliff PLC

(57) ABSTRACT

In an information processing device, a first acquisition portion acquires a usage end time and a usage end point of an automatic driving vehicle. A second acquisition portion acquires information about a side trip point of the automatic driving vehicle. A derivation portion derives an expected time of arrival of the automatic driving vehicle at the usage end point by way of the side trip point. A permission portion permits a drop-in at the side trip point when the expected time of arrival at the usage end point is before the usage end time.

5 Claims, 4 Drawing Sheets

| USER ID | RENTAL ID | RESERVATION ID | USAGE HISTORY |

| VEHICLE ID | RENTAL ID | RESERVATION ID | POSITIONAL INFORMATION |

| RENTAL ID | VEHICLE ID | TIME INFORMATION | POINT INFORMATION |

| RESERVATION ID | VEHICLE ID | TIME INFORMATION | POINT INFORMATION |

INFORMATION PROCESSING DEVICE AND INFORMATION PROCESSING METHOD

INCORPORATION BY REFERENCE

The disclosure of Japanese Patent Application No. 2019-045626 filed on Mar. 13, 2019 including the specification, drawings and abstract is incorporated herein by reference in its entirety.

BACKGROUND

1. Technical Field

The present disclosure relates to an information processing device and an information processing method each for processing information to use an automatic driving vehicle.

2. Description of Related Art

Japanese Unexamined Patent Application Publication No. 2008-3027 (JP 2008-3027 A) describes a navigation device configured such that an estimated necessary time from a current position of a vehicle to a destination is found, and when the estimated necessary time is shorter than an input desired necessary time, a side trip point at which the vehicle can drop in within a spare time that is a difference between the desired necessary time and the estimated necessary time is displayed.

SUMMARY

In a system where a user rents an automatic driving vehicle by setting a usage end time, a usage start point, and a usage end point in advance, the user may want to take a side trip while the automatic driving vehicle is traveling toward the usage end point. It is desired to cope with such a request of the user to take a side trip.

An object of the present disclosure is to provide a technique that enables a side trip of a user who boards an automatic driving vehicle.

In order to achieve the above object, an information processing device according to one aspect of the present disclosure includes a first acquisition portion, a second acquisition portion, a derivation portion, and a permission portion. The first acquisition portion is configured to acquire a usage end time and a usage end point of an automatic driving vehicle. The second acquisition portion is configured to acquire information about a side trip point of the automatic driving vehicle. The derivation portion is configured to derive an expected time of arrival of the automatic driving vehicle at the usage end point by way of the side trip point. The permission portion is configured to permit a drop-in at the side trip point when the expected time of arrival at the usage end point is before the usage end time.

Another aspect of the present disclosure relates to an information processing method. The information processing method includes: a step of acquiring a usage end time and a usage end point of an automatic driving vehicle; a step of acquiring a side trip point of the automatic driving vehicle; a step of deriving an expected time of arrival of the automatic driving vehicle at the usage end point by way of the side trip point; and a step of permitting a drop-in at the side trip point when the expected time of arrival at the usage end point is before the usage end time.

With the present disclosure, it is possible to provide a technique that enables a side trip of a user who boards an automatic driving vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
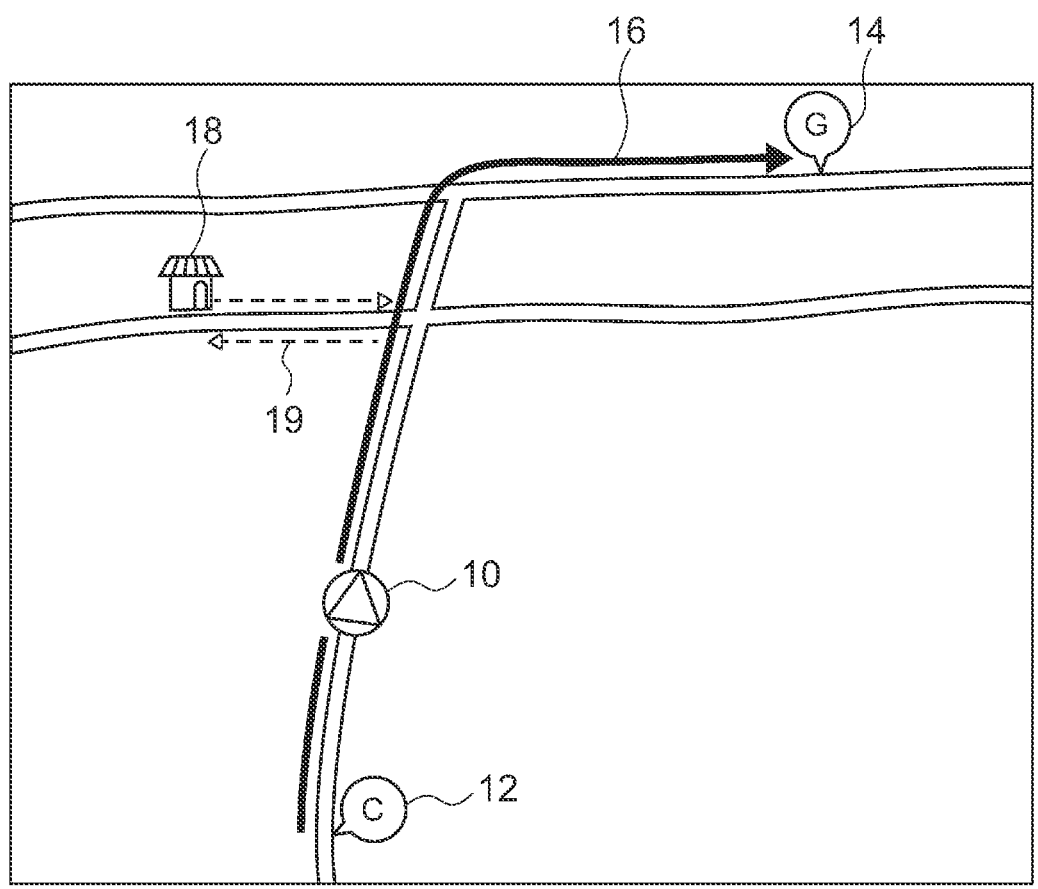
FIG. 1 is a view to describe an outline of an information processing system of an embodiment.

FIG. 1 is a view to describe an outline of an information processing system of an embodiment. FIG. 1 illustrates a state where an automatic driving vehicle 10 travels on a driving route 16 by automatic driving from a usage start point 12 toward a usage end point 14. The usage start point 12 and the usage end point 14 are set in advance by a user who boards the automatic driving vehicle 10 and are registered in a server device configured to manage the automatic driving vehicle 10. The usage end point 14 may be a destination of the user.

The automatic driving vehicle 10 can perform automatic driving and travels along the driving route 16 that connects the usage start point 12 to the usage end point 14. Further, the automatic driving vehicle 10 also moves by automatic driving when the automatic driving vehicle 10 moves to the usage start point 12 before usage start. The automatic driving vehicle 10 is rented by the user as a rental vehicle and is to be returned at the usage end point 14 by a usage end time set at the time of rental. Rental information that determines the usage end time and the usage end point 14 is managed by a server device.

In a case where the user boarding the automatic driving vehicle 10 wants to drop in at a side trip point 18, the user can ask the information processing system whether the user can drop in at the side trip point 18 or not. When the information processing system receives, from the user, a request to drop in at the side trip point 18, the information processing system receives information about the side trip point 18 and derives a side trip route 19, and the information processing system determines whether the automatic driving vehicle 10 can reach the usage end point 14 by the usage end time even by way of the side trip route 19.

When the automatic driving vehicle 10 can reach the usage end point 14 by the usage end time, the information processing system permits the side trip, but when the automatic driving vehicle 10 cannot reach the usage end point 14 by the usage end time, the information processing system does not permit the side trip. When the information processing system permits the side trip, the information processing system changes the driving route 16 of the automatic driving vehicle 10 so that the automatic driving vehicle 10 heads for the usage end point 14 by way of the side trip point 18. Hereby, the automatic driving vehicle 10 can arrive at the usage end point 14 by the usage end time after the automatic driving vehicle 10 takes a side trip by automatic driving by changing the driving route 16 set in advance.

Figure 2:
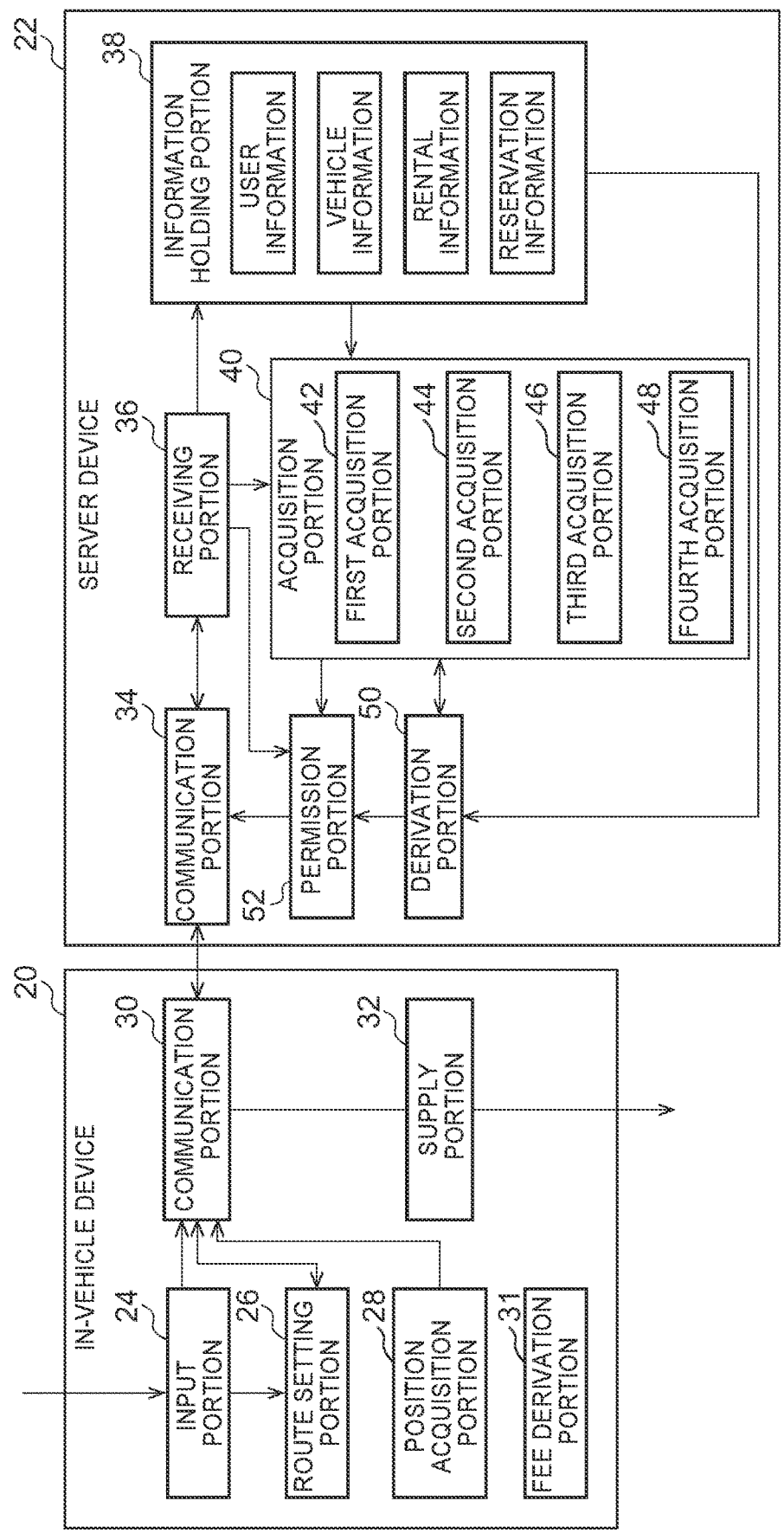
FIG. 2 is a view illustrating a functional configuration of the information processing system.

FIG. 2 illustrates a functional configuration of an information processing system 1. In FIG. 2, each element described as a functional block that performs various processes can be constituted by a circuit block, a memory, or another LSI in terms of hardware and can be implemented by a program or the like loaded in a memory in terms of software. Accordingly, it is understood by a person skilled in the art that these functional blocks can be achieved in various forms only by hardware, only by software, or in combination of hardware and software, and they are not limited to any of the forms.

The information processing system 1 includes an in-vehicle device 20 and a server device 22. The in-vehicle device 20 is provided in the automatic driving vehicle 10. The server device 22 manages rental of a plurality of automatic driving vehicles 10.

The in-vehicle device 20 includes an input portion 24, a route setting portion 26, a position acquisition portion 28, a communication portion 30, a fee derivation portion 31, and a supply portion 32. The server device 22 includes a communication portion 34, a receiving portion 36, an information holding portion 38, a first acquisition portion 42, a second acquisition portion 44, a third acquisition portion 46, a fourth acquisition portion 48 (when these acquisition portions are not distinguished from each other, they are referred to as an "acquisition portion 40"), a derivation portion 50, and a permission portion 52.

The input portion 24 of the in-vehicle device 20 is an interface into which the user can input data and, for example, receives an input to request a side trip. Information to request the side trip is transmitted to the server device 22 via the communication portion 30. The information to request the side trip includes information about the side trip point 18. The information about the side trip point 18 includes positional information of the side trip point 18 or address information of the side trip point 18, and a stay time at the side trip point 18 that is set by the user.

The route setting portion 26 sets a driving route of the automatic driving vehicle 10. The route setting portion 26 sets the driving route based on information input by the user or set at the time of rental and sets the driving route in accordance with side trip permission from the server device 22. The automatic driving vehicle 10 travels automatically along the driving route set by the route setting portion 26.

The position acquisition portion 28 acquires positional information of the automatic driving vehicle 10 and its acquisition time by use of a global positioning system (GPS) and transmits them to the server device 22 via the communication portion 30.

The supply portion 32 is a display or a speaker provided in the in-vehicle device 20 and is configured to provide information to the user. For example, the supply portion 32 notifies the user of permission or disapproval of the side trip. Further, when the user terminates the usage of the automatic driving vehicle 10 at the side trip point 18 before the user goes to the usage end point 14, the supply portion 32 supplies, to the user, information about transportation from the side trip point 18 to the usage end point 14.

The fee derivation portion 31 derives a usage fee of the automatic driving vehicle 10. The fee derivation portion 31 may derive a usage fee corresponding to a usage time of the automatic driving vehicle 10 or may derive a usage fee corresponding to a travel distance of the automatic driving vehicle 10. In a case where the automatic driving vehicle 10 is an electric vehicle, the fee derivation portion 31 may derive a usage fee corresponding to a power consumption of the automatic driving vehicle 10. Hereby, a fee corresponding to the side trip can be derived. Since the fee derivation portion 31 is provided in the in-vehicle device 20, even when the automatic driving vehicle 10 cannot communicate with the server device 22, the user can adjust the fee.

The communication portion 34 of the server device 22 receives information from the communication portion 30 of the in-vehicle device 20 and transmits information to the communication portion 30. The receiving portion 36 receives information on the automatic driving vehicle 10 from the communication portion 34 such that the information is held in the information holding portion 38, and the receiving portion 36 receives information to request a side trip from the user. When the receiving portion 36 receives the request of the side trip, the receiving portion 36 causes the permission portion 52 to perform a side trip permission determination and causes the information holding portion 38 to transmit information to be used for the side trip permission determination to the acquisition portion 40.

The information holding portion 38 holds user information, vehicle information, rental information, and reservation information. FIGS. 3A to 3D illustrate pieces of information to be held in the information holding portion 38. The user information illustrated in FIG. 3A includes a user ID, a rental ID, a reservation ID, and a usage history. The rental ID connects the user ID with the rental information, and the reservation ID connects the user ID with the reservation information.

Figures 3A, 3B, 3C, 3D, 4:
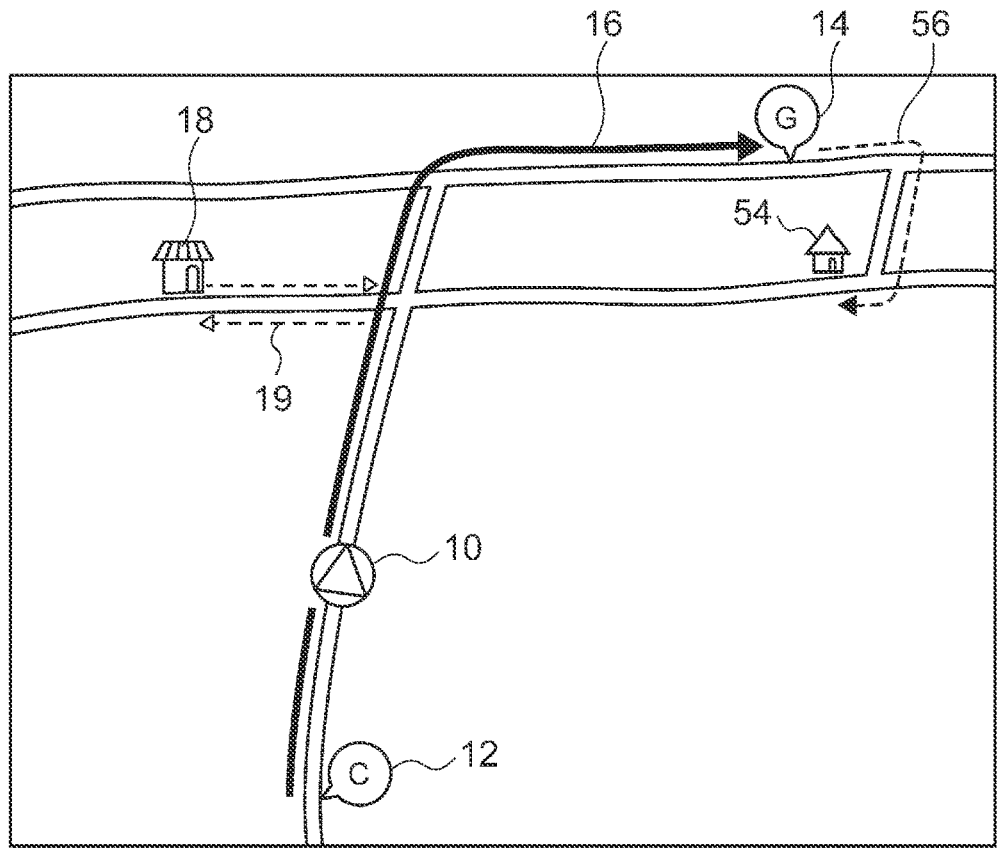
FIG. 3A is a view illustrating information to be held in an information holding portion.
FIG. 3B is a view illustrating information to be held in the information holding portion.
FIG. 3C is a view illustrating information to be held in the information holding portion.
FIG. 3D is a view illustrating information to be held in the information holding portion.
FIG. 4 is a view to describe permission of a side trip in consideration of a next usage reservation.

The vehicle information illustrated in FIG. 3B includes a vehicle ID, a rental ID, a reservation ID, and positional information. The vehicle ID is connected with the rental ID and the reservation ID so that a usage state can be recognized. The positional information may include information indicative of a driving route.

The rental information illustrated in FIG. 3C includes a rental ID, a vehicle ID, time information, and point information. The time information in the rental information defines a rental time and indicates a usage start time and a usage end time. The point information in the rental information indicates the usage start point 12 and the usage end point 14 of the vehicle. Based on the time information and the point information in the rental information, the usage end time and the usage end point of the vehicle can be recognized.

The reservation information illustrated in FIG. 3D includes a reservation ID, a vehicle ID, time information, and point information. The time information in the reservation information indicates a reserved start time and a reserved end time. The point information in the reservation information indicates a start point where usage starts and an end point where the usage ends.

Now refer back to FIG. 2. When the acquisition portion 40 receives a request of a side trip from the user, the acquisition portion 40 acquires information about the side trip from the receiving portion 36 and acquires information for a side trip permission determination from the information holding portion 38 and the derivation portion 50. The first acquisition portion 42 acquires the usage end time and the usage end point 14 of the automatic driving vehicle from the information holding portion 38.

The second acquisition portion 44 acquires information about the side trip point 18 requested by the user of the automatic driving vehicle 10 from the in-vehicle device 20 via the receiving portion 36. Further, the second acquisition portion 44 acquires positional information and a driving route of the automatic driving vehicle 10.

The derivation portion 50 derives an expected time of arrival of the automatic driving vehicle 10 at the usage end point 14 by way of the side trip point 18 based on the information about the side trip point 18 that is acquired by the second acquisition portion 44. The derivation portion 50 derives an expected time of arrival at the usage end point 14 based on a traveling time on the side trip route 19 that goes through the side trip point 18 and the stay time at the side trip point 18 that is set by the user, and the derivation portion 50 sends it to the permission portion 52.

When the expected time of arrival at the usage end point 14 is before the usage end time, the permission portion 52 permits a drop-in at the side trip point 18. When the side trip is permitted by the permission portion 52, the permission result is transmitted to the in-vehicle device 20, and the route setting portion 26 sets a driving route that goes through the side trip point 18. The permission result transmitted to the in-vehicle device 20 may include information on the side trip route 19 derived by the derivation portion 50. Thus, when the automatic driving vehicle 10 can arrive at the usage end point 14 by the usage end time, the side trip is permitted, so that the automatic driving vehicle 10 heads for the side trip point 18.

Note that, in a case where the side trip is permitted by the permission portion 52, the in-vehicle device 20 may ask the user whether the side trip is executed or not, and the input portion 24 receives approval of the user about whether the driving route 16 can be changed or not. That is, when the permission of the side trip by the permission portion 52 and the approval of the side trip by the user are provided, the route setting portion 26 may set the driving route so that the driving route goes through the side trip point 18. Even in a case where the permission by the permission portion 52 is provided, if the approval by the user is not provided, the route setting portion 26 does not change the driving route.

Next will be described an aspect in which, when the user requests a side trip while the user is boarding the automatic driving vehicle 10, the information processing system 1 checks on next reservation information of the automatic driving vehicle 10, and if the automatic driving vehicle 10 is not late for the next reservation, the side trip is permitted.

FIG. 4 is a view to describe permission of a side trip in consideration of a next usage reservation. FIG. 4 illustrates a state where the automatic driving vehicle 10 travels on the driving route 16 by automatic driving from the usage start point 12 toward the usage end point 14. A next usage reservation of the automatic driving vehicle 10 is made by another user, and the automatic driving vehicle 10 is to arrive at a start point 54 by a start time so as not to be late for the next reservation.

The third acquisition portion 46 acquires reservation information of the automatic driving vehicle 10 that is held in the information holding portion 38 and acquires an arrival time limit at the usage end point 14 for the automatic driving vehicle 10 to arrive at the start point 54 for the next usage by the start time. The arrival time limit is derived by the derivation portion 50.

The derivation portion 50 derives a deadhead time of a deadhead route 56 along which the automatic driving vehicle 10 moves from the usage end point 14 to the next start point 54 based on present rental information and next reservation information, and the derivation portion 50 derives a first arrival time limit at the usage end point 14 by subtracting the derived deadhead time from the start time.

When the expected time of arrival at the usage end point 14 is before the first arrival time limit at the usage end point 14, the permission portion 52 permits a drop-in at the side trip point 18. Thus, if the automatic driving vehicle 10 is not late for the next reservation even when the user takes a side trip by the automatic driving vehicle 10 that the user is boarding, the side trip is permitted.

Next will be described an aspect in which, when the user requests a side trip while the user is boarding the automatic driving vehicle 10, the user terminates the usage of the automatic driving vehicle 10 at the side trip point 18. Even if the user terminates the usage of the automatic driving vehicle 10 at any location, the automatic driving vehicle 10 can automatically move to the start point 54 for the next usage. In view of this, when the automatic driving vehicle 10 cannot arrive at the usage end point 14 by the first arrival time limit at the usage end point 14 if the user drops in at the side trip point 18, the user may terminate the usage of the automatic driving vehicle 10 at the side trip point 18. The user can request a termination of the usage of the automatic driving vehicle 10 at the side trip point 18.

The fourth acquisition portion 48 acquires a second arrival time limit at the side trip point 18 for the automatic driving vehicle 10 to arrive at the start point 54 for the next usage by the start time without passing through the usage end point 14. The second arrival time limit at the side trip point 18 is derived by the derivation portion 50.

The derivation portion 50 derives a deadhead time from the side trip point 18 to the start point 54 based on a driving route from the side trip point 18 to the start point 54 and derives the second arrival time limit at the side trip point 18 by subtracting the deadhead time from the start time. Since the second arrival time limit at the side trip point 18 is derived so as not to include a stay time at the side trip point 18, the second arrival time limit is more advantageous than the first arrival time limit at the usage end point 14 that includes the stay time. Further, the derivation portion 50 derives an expected time of arrival of the automatic driving vehicle 10 at the side trip point 18 based on the driving route from the position of the automatic driving vehicle 10 to the side trip point 18.

In a case where the expected time of arrival at the usage end point 14 exceeds the first arrival time limit at the usage end point 14 at the time when the side trip is requested, when the expected time of arrival at the side trip point 18 is before the second arrival time limit at the side trip point 18, the permission portion 52 permits a change of the usage end point to the side trip point 18. Hereby, even when the user terminates the usage of the automatic driving vehicle 10 at the side trip point 18, the automatic driving vehicle 10 is not late for the next reservation.

In a case where the termination of the usage of the automatic driving vehicle 10 at the side trip point 18 is permitted, when the user accepts the termination, the route setting portion 26 changes the driving route of the automatic driving vehicle 10. For example, the supply portion 32 notifies the user of a message "The usage of the vehicle will be terminated at the side trip point 18. Do you accept?," and when the user accepts this via the input portion 24, the route setting portion 26 changes the driving route so that the automatic driving vehicle 10 heads for the start point 54 for the next reservation from the side trip point 18. This can cause the user to recognize that the automatic driving vehicle 10 moves without staying at the side trip point 18 and without carrying the user. When the route setting portion 26 changes the driving route, the automatic driving vehicle 10 can travel without passing through the usage end point 14. Further, the user can freely drop off the automatic driving vehicle 10 at any position as far as the automatic driving vehicle 10 is not late for the next reservation, and wherever the user drops off the automatic driving vehicle 10, the automatic driving vehicle 10 can be deadheaded.

When the change of the usage end point to the side trip point 18 is permitted, that is, when the user terminates the usage of the automatic driving vehicle 10 at the side trip point 18, the supply portion 32 supplies, to the user, information about transportation from the side trip point 18 to the usage end point 14 as an original usage end point. The supply portion 32 informs the user of the information about transportation, e.g., a transportation method to the usage end point 14 by bus, train, and walk.

Figure 5:
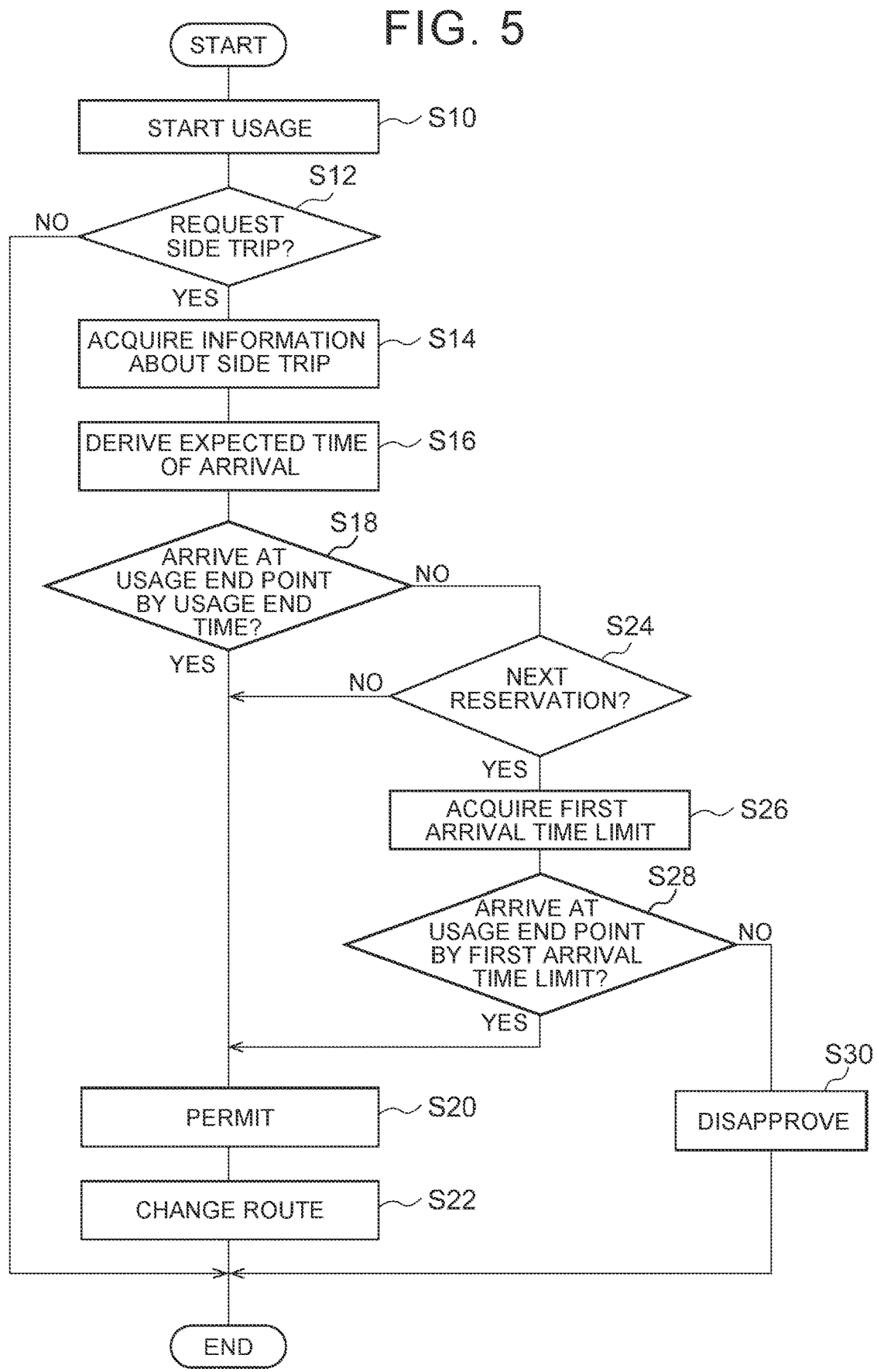
FIG. 5 is a flowchart of a process of permitting a side trip.

FIG. 5 is a flowchart of a process of permitting a side trip. The automatic driving vehicle 10 starts automatic driving from the usage start point based on the driving route set by the route setting portion 26 (S10).

When the input portion 24 does not receive any request of a side trip (N in S12), this process is ended. When the input portion 24 receives a request of a side trip (Y in S12), information about the side trip input by the user is transmitted to the server device 22, and the first acquisition portion 42 acquires the information about the side trip (S14).

The derivation portion 50 derives an expected time of arrival based on positional information of the usage end point and the information about the side trip (S16). The permission portion 52 determines whether or not the automatic driving vehicle 10 can arrive the usage end point by the usage end time if it takes the side trip, that is, whether the expected time of arrival is before the usage end time or not (S18).

When the expected time of arrival is before the usage end time (Y in S18), the permission portion 52 permits a drop-in at the side trip point (S20). The route setting portion 26 receives a permission result from the permission portion 52 and sets the driving route of the automatic driving vehicle 10 so that the automatic driving vehicle 10 drops in at the side trip point 18 (S22), and here, this process is ended.

When the expected time of arrival is not before the usage end time (N in S18), the permission portion 52 determines whether a next usage reservation of the automatic driving vehicle 10 is made or not (S24). When the next usage reservation is not made (N in S24), the permission portion 52 permits a drop-in at the side trip point (S20).

When the next usage reservation is made (Y in S24), the third acquisition portion 46 acquires the first arrival time limit at the usage end point 14 for the automatic driving vehicle 10 to arrive at the start point 54 for the next usage by the start time (S26). The first arrival time limit is derived by the derivation portion 50 based on current rental information and next reservation information.

The permission portion 52 determines whether the expected time of arrival at the usage end point 14 is before the first arrival time limit at the usage end point 14 or not (S28). When the expected time of arrival at the usage end point 14 is before the first arrival time limit at the usage end point 14 (Y in S28), the permission portion 52 permits a drop-in at the side trip point (S20). When the expected time of arrival at the usage end point 14 is not before the first arrival time limit at the usage end point 14 (N in S28), the permission portion 52 does not permit a drop-in at the side trip point (S30), so that this process is ended without the change of the driving route of the automatic driving vehicle 10.

The present disclosure has been described above based on the embodiment. The embodiment is just an example, and it is understood by a person skilled in the art that various modifications can be made in terms of combinations of the constituents and the processes and such modifications are also included in the scope of the present disclosure.

The embodiment deals with an aspect in which the acquisition portion 40, the derivation portion 50, and the permission portion 52 are provided in the server device 22, but the embodiment is not limited to this aspect. For example, all those constituents, i.e., the acquisition portion 40, the derivation portion 50, and the permission portion 52 may be provided in the in-vehicle device 20, or some of the acquisition portion 40, the derivation portion 50, and the permission portion 52 may be provided in the in-vehicle device 20. In any case, the in-vehicle device 20 and the server device 22 each function as an information processing device.

Further, the embodiment deals with an aspect in which the input portion 24 via which a side trip is requested is provided in the in-vehicle device 20, but the embodiment is not limited to this aspect. For example, a side trip may be requested from a portable terminal owned by the user boarding the automatic driving vehicle 10.

What is claimed is:

1. An information processing device comprising:
   circuitry configured to
      acquire a usage end time and a usage end point of an automatic driving vehicle;
      acquire information about a side trip point of the automatic driving vehicle, the information about the side trip point including a stay time at the side trip point;
      derive an expected time of arrival of the automatic driving vehicle at the usage end point by way of the side trip point; and
      permit a drop-in at the side trip point when the expected time of arrival at the usage end point is before the usage end time, to cause the automatic driving vehicle to travel to the side trip point.

2. The information processing device according to claim 1, wherein the circuitry is further configured to
   when a start time and a start point of a next usage reservation are set for the automatic driving vehicle, acquire a first arrival time limit at the usage end point for the automatic driving vehicle to arrive at the start point for the next usage by the start time, and
   when the expected time of arrival at the usage end point is before the first arrival time limit at the usage end point, permit the drop-in at the side trip point.

3. The information processing device according to claim 2, wherein the circuitry is further configured to
   acquire a second arrival time limit at the side trip point for the automatic driving vehicle to arrive at the start point for the next usage by the start time without passing through the usage end point,
   derive an expected time of arrival of the automatic driving vehicle at the side trip point, and
   in a case where the expected time of arrival at the usage end point exceeds the first arrival time limit at the usage end point, when the expected time of arrival at the side trip point is before the second arrival time limit at the side trip point, permit a change of the usage end point to the side trip point.

4. The information processing device according to claim 3, wherein the circuitry is further configured to, when the change of the usage end point to the side trip point is permitted, supply, to a user boarding the automatic driving vehicle, information about transportation from the side trip point to an original usage end point.

5. An information processing method comprising:
   acquiring a usage end time and a usage end point of an automatic driving vehicle;
   acquiring information about a side trip point of the automatic driving vehicle, the information about the side trip point including a stay time at the side trip point;
   deriving an expected time of arrival of the automatic driving vehicle at the usage end point by way of the side trip point; and
   permitting a drop-in at the side trip point when the expected time of arrival at the usage end point is before the usage end time, to cause the automatic driving vehicle to travel to the side trip point.

\* \* \* \* \*